INVENTORS
NORMAN J. HOLTER
WILFORD R. GLASSCOCK

BY *James H. Littlepage*
ATTORNEY

United States Patent Office 3,229,687
Patented Jan. 18, 1966

3,229,687
ELECTROCARDIO RECORDING AND REPRODUCING SYSTEM
Norman J. Holter and Wilford R. Glasscock, Helena, Mont.
Filed Jan. 8, 1964, Ser. No. 336,606
9 Claims. (Cl. 128—2.06)

This invention relates to an electrocardiographic recording and reproducing system and, more particularly, a system such as disclosed in our copending application Serial No. 207,963 filed July 6, 1962, entitled, Electro-Cardiographic Means, of which this application is a continuation in part.

It has heretofore been proposed to record electrocardiogram signals on magnetic tape at natural speed and to display them, in the form of overlapping traces, on an oscilloscope. It was also proposed to telescope many hours of recording into a few minutes display time by playing back the recordings many times faster than natural speed and to display the ECG wave forms by overlapping traces so that a diagnostician could compare successive waveform patterns and readily detect significant variations which characterize abnormalities, or warnings of abnormalities. One major previously encountered was in synchronizing the oscilloscope so that traces of successive ECG cycles occupy the same place along the horizontal or H axis of an oscilloscope. Not only does a subject's heart beat rate change because of activity, stimulation, and other factors, but even when the heart beat is at a relatively steady average rate, it is still asynchronous. Thus, ECG signals produced by a heart averaging, for example, 60 beats per minute, if displayed on an oscilloscope self-synchronized at 60 sweeps per second, will produce trace patterns which vary so widely along the H axis of the oscilloscope that they do not overlap, and cannot practically be compared by the diagnostician watching the oscilloscope.

One previous approach to synchronization of the scope was to utilize the R wave of an ECG signal as a synchronizing pulse. When electrodes are applied to a subject's skin to pick up the minute currents accompanying a heart beat, the currents of a single beat, if faithfully amplified and displayed or recorded on an instrument wherein the H axis represents time and the V axis direction and amplitude of voltage, produce a pattern of voltage swings conventionally designated by letters, starting with "P." In typical pattern, utilizing conventional terminology, the P wave which starts the cycle is a lobe of small amplitude of short duration and, following a brief interval of quiescence, the voltage swings through the QRS complex in which the voltage first swings briefly negative, then through a relatively sharp positive spike and thence through a brief negative swing, which may be followed by a rest period of more or less quiescence interrupted by a positive swing (the T wave) of lesser amplitude than the R wave. The cycle for the next beat starts with another P wave. Although there are other waves which are studied, and the relative sizes and shapes of these various waves and their relative timing will vary (and therein lie the keys to diagnosis), the voltage of the R wave is characteristically a spike of by far the greatest amplitude of all the waves. The R wave could easily be used for triggering the sweep of an oscilloscope but for its recurrence about two-sevenths along the course of the cycle to be displayed by a trace overlying asynchronous preceeding and succeeding cycles. If the R wave be picked off from the display signal channel and used to trigger the start of a scope sweep, then the P and Q waves of the next suceeding beat cycle appear at the end of the trace, with resultant false reading.

The primary object of this invention is to provide an ECG recording and superimposing display system wherein the R waves of successive ECG signals are utilized for synchronizing the display, in natural sequence, of superimposed signals on a cathode ray oscilloscope. More particularly, it is intended now to detect and amplify ECG signals and record them on a magnetic tape, and to provide, in a play-back instrument, two pick-up heads longitudinally displaced along the line of movement of the tape so that the first head will detect the R wave of a single heart beat sequence at least as soon as the P wave portion of that sequence reaches the second pick-up head. By utilizing the R wave signal detected by the first head as the synchronizing signal for starting the sweep of an oscilloscope, the display of the sequence detected by the second pick-up head can be started no later than the occurrence of the P wave.

Since the recording instrument is to be carried about by the subject and, hence, should be small, and since at least eight hours activities are to be recorded, it is contemplated that the recording tape speed be as slow as possible to minimize the tape bulk while still providing fidelity. A satisfactory tape speed in the order of 7½ inches per minute provides approximately 0.125 inch of tape length for a single beat sequence for a beat rate of 60 per minute, but this means that the recordings of the P and R waves are so close to one another, i.e., about .018 inch apart, that it is difficult to place the recording and pick-up heads in such close proximity along a single signal track. In order to accommodate the pairs of recording and pick-up heads, it is intended now to provide two recording heads laterally and longitudinally spaced from one another for recording similar signal tracks, one leading the other, so that the two pick-up heads need not be crowded together.

Another object is to utilize a signal derived from the R wave synchronizing pulse for a display of changes in heart beat rate, skip beats and double beats. More particularly, it is intended to provide, in the play-back-amplifying and display portion of the subject system, a separate synchronizing channel which derives a synchronizing pulse from the R wave of an electrocardiographic recording, and which utilizes the derived synchronizing pulses not only for laterally sweeping the waveform trace on an oscilloscope, but also for denoting pulse rate on a separate oscilloscope. More specifically, this object is to apply the synchronizing pulses to the vertical plates of a second oscilloscope whose horizontal plates are energized at a relatively slow regular sweep rate by a sawtooth generator so that a series of many vertical traces resulting from the synchronizing pulses will appear on the face of the second oscilloscope, and so that the lengths of the vertical traces will vary according to the length of time between the R waves of successive heart beat cycles and so that an exceptionally long vertical trace will denote a delayed beat.

A further object is to provide a reproducing and waveform display system including two amplifiers of different characteristics so that the waveform of an ECG signal may be displayed either with true fidelity or with exaggerated characteristics. It is likewise intended, by the provision of the two amplifiers, to provide for full-fidelity display of the ECG signals at either high or low speed playback. Taking into account that the voltage output of the pick-up head is a function of the rate of change of the magnetic flux of the tape, it becomes apparent that the signal output of the pick-up head becomes a derivative of the recording on the tape, the derived signal being characterized by over-emphasis of the higher frequencies. It is therefore proposed now to provide one amplifier which will compensate for signal distortion resulting from differentiation so that ECG signals will appear in original form on an oscilloscope.

Yet another object in the provision of a non-compensating amplifier is to facilitate oral detection of variations in ECG signals reproduced at greater than natural speed. It has heretofore been proposed to record ECG signals on magnetic tape and then feed the output of a reproducer amplifier simultaneously to an oscilloscope and to an audio system so that a diagnostician can detect variations between ECG signals orally, as well as visually, by changes in tone and clicks produced by ECG signal variations and transient phenomena. It has been found that some of these variations and phenomena can be detected more easily, since they are more pronounced, when the ECG signals are played back with over-emphasis of the higher frequencies, and then fed to the audio amplifier without compensation. An object now is to provide for the audible reproduction of ECG signals at much greater than natural speed, and with over-emphasis of the high frequency components of the signals.

These and other objects will be apparent from the following specification and drawings, in which.

Figure 3:
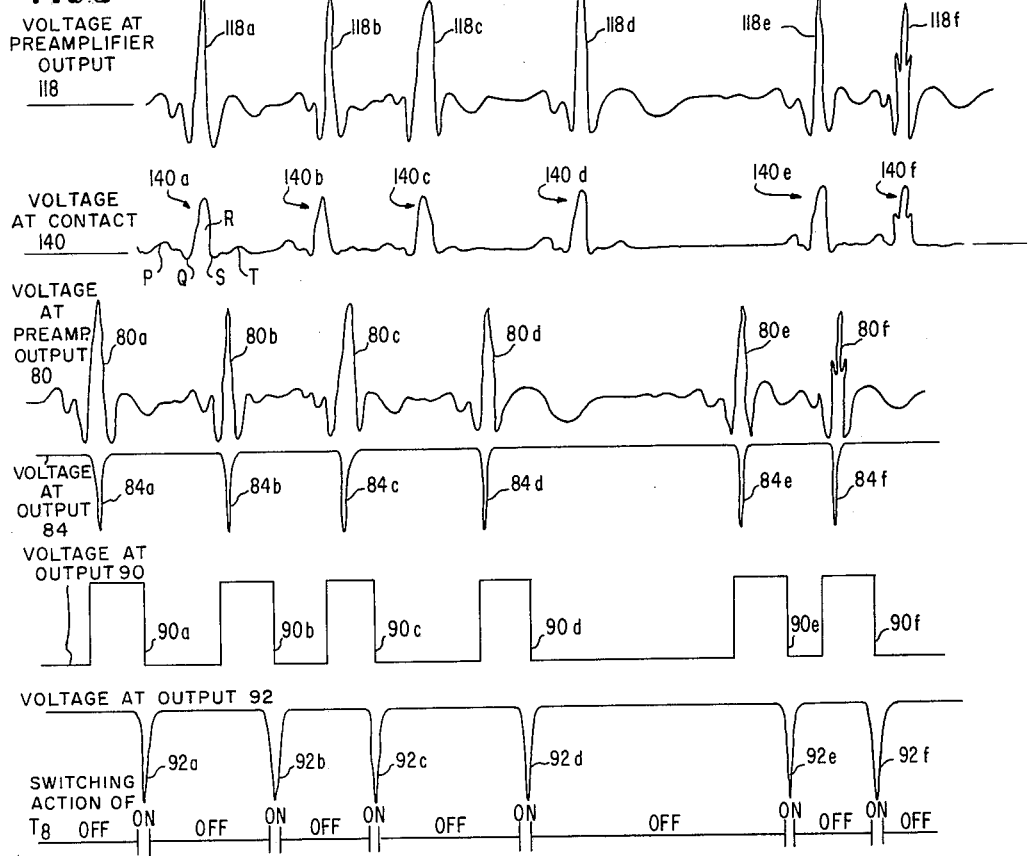
Figure 4:
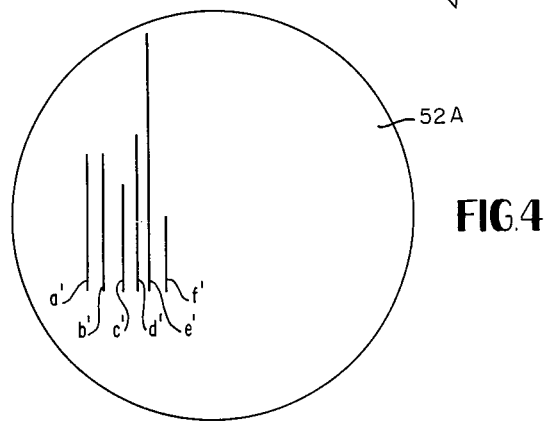

FIG. 3 is a waveform chart showing display and synchronizing signals at various points along the apparatus and in time relationship to one another; and, FIG. 4 is a diagram of the signals resulting from voltage 98a through 98f of FIG. 3 as they would appear on the face of cathode ray oscilloscope tube 52a.

Figure 1:
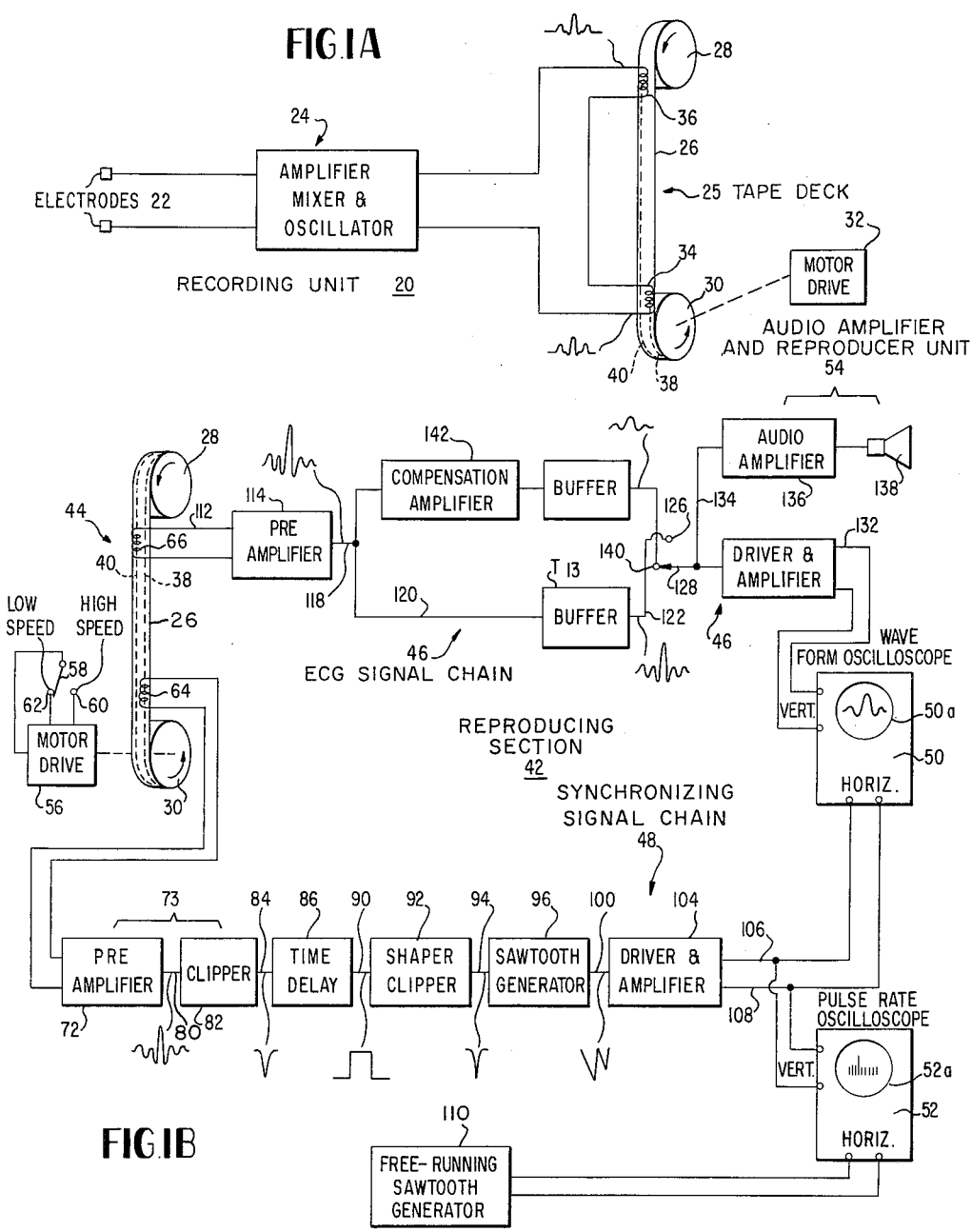
FIG. 1A is a block diagram of the ECG signal recording apparatus worn on the person of a subject.
FIG. 1B is a block diagram of the ECG signal reproducing apparatus used for study and diagnosis.

Referring now to FIGS. 1A and 1B, the system shown in block diagram in one typical operating mode comprises a recording unit 20 adapted to be carried about on the person of a subject to be observed with electrodes 22 attached to the subject at spaced locations near the heart. Voltages appearing across the electrodes are fed to a unit 24 comprising a voltage amplifier, oscillator, mixer, and power supply. Recording unit 20 also includes a tape deck 25 for recording ECG signals on a tape 26 pulled from a supply reel 28 onto a take-up reel 30 at a fixed feed rate, preferably in the order of 7½ inches per minute, by a motor 32. The components and make-up of recording unit 20 are miniaturized to the greatest possible extent, and are conventional but for one cardinal feature, namely, tape deck 25 has two magnetic recording heads 34 and 36 used for recording the same signal on two laterally spaced tracks 38 and 40 on the tape. The recording heads are longitudinally as well as laterally spaced from one another so that the signal on track 38 recorded by head 34 leads the signal on track 40 recorded by head 36 by a predetermined distance along the length of tape 26. After recording the ECG activities of the subject as he goes about his daily activities for perhaps eight hours, the tape is re-wound and subsequently played back for study and diagnosis in a reproducing section 42 of FIG. 1B and FIGS. 2A and 2B which may be disposed in a laboratory or clinic.

Reproducing section 42 consists essentially of a tape deck 44, ECG signal chain 46 and synchronizing signal chain 48 both feeding to an oscilloscope 50 which displays ECG waveforms, another oscilloscope 52 for displaying marks representative of variations in time between successive R waves and the occurrence of premature systoles, and an audio amplifier and reproducer unit 54. Both oscilloscopes 50 and 52 are preferably of the cathode ray type, and with certain exceptions and modifications noted hereinafter, the individual components of which the tape deck 44 and chains 46 and 48 are comprised are conventional, the invention residing in the system and the novel manner in which they cooperate with one another and the method of recording and reproducing ECG signals.

Tape deck 44, in which tape 26 is played back has a motor drive 56 and a control device, such as a switch arm 58 having a high speed contact 60 and a low speed contact 62. The speed change may also be accomplished by gears, the point being that when the control is in high speed position, tape 26 is driven at a multiple, such as 60 times, of the speed at which it was recorded, and with the control in low speed position the tape is driven at or even below its natural speed, i.e., the speed at which it was recorded. Thus, a recording of eight hours duration may be played back at high speed in eight minutes and, when it is desired to re-run certain portions of the tape to observe and perhaps photograph individual ECG signals in great detail the control is shifted to slow speed. The cardinal feature of novelty in tape deck 44 is that it contains two pick-up heads 64 and 66 respectively used for deriving synchronizing and ECG signals from tape 26. Pick-up heads 64 and 66 are laterally spaced the same as recording heads 34 and 36, and are spaced longitudinally of the tape slightly less than the recording heads so that with the tape moving at a fixed rate of speed the R wave of a single ECG sequence on track 38 will lead the R wave of that same sequence recorded on track 40 by a predetermined time interval. The spacing between the pairs of heads is diagrammatically illustrated with exaggeration for purposes of emphasis. In actual practice, heads 64 and 66 are spaced so that head 64 will pick up the start of an R wave of a given ECG sequence recorded on track 38 slightly before head 66 picks up the start of the P wave of that sequence recorded on track 40.

Figure 2:
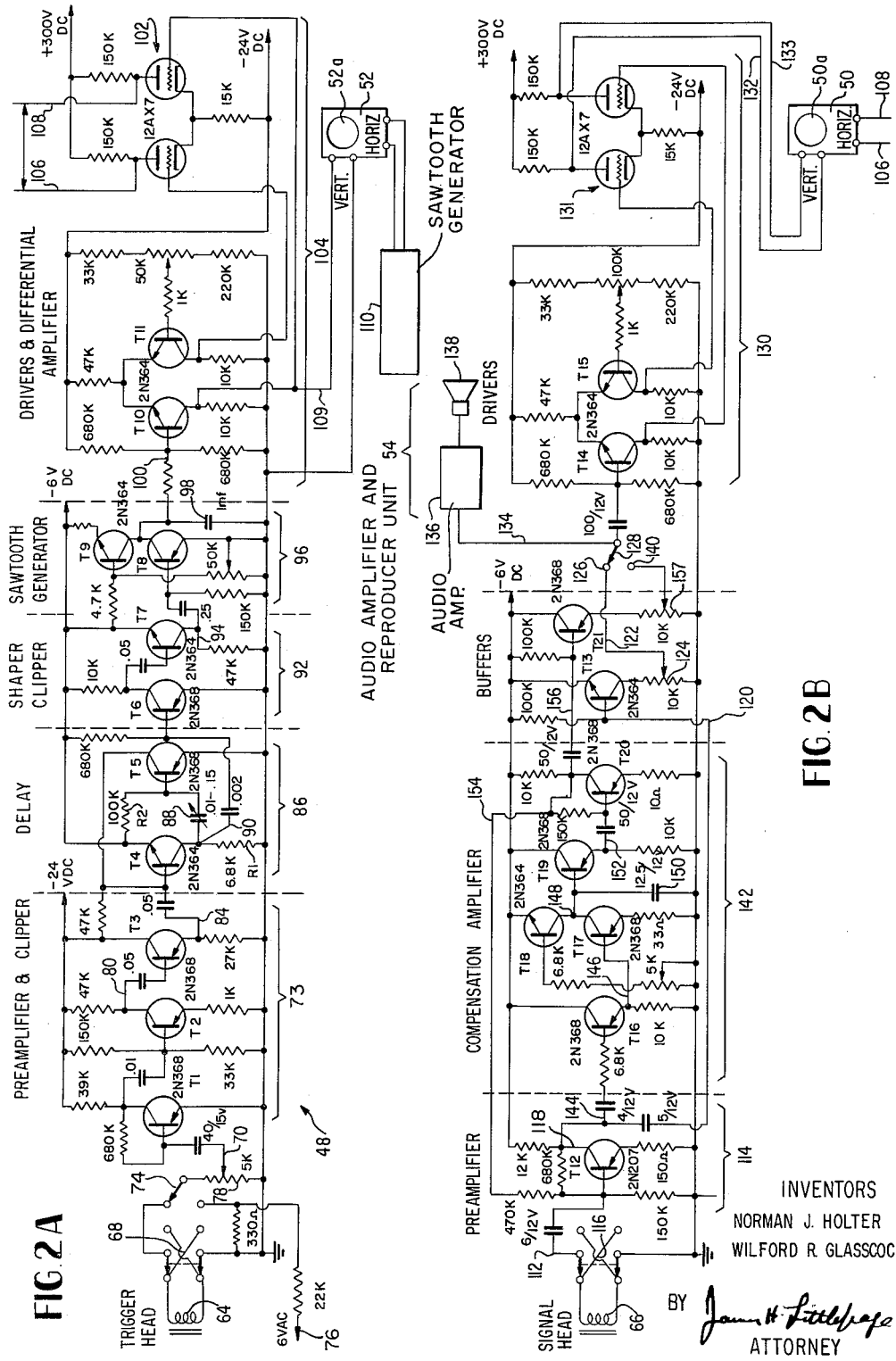
FIG. 2A is a circuit diagram of the synchronizing chain 48 shown in block diagram in FIG. 1B.
FIG. 2B is a circuit diagram of the display signal chain 46 shown in block diagram in FIG. 1B.

Referring now to the synchronizing signal chin 48 shown in circuit diagram in FIG. 2A, and with reference also to the block diagram in the lower portion of FIG. 1B and the timing diagram FIG. 3, the synchronizing signal derived by trigger pickup head 64 from track 38 is fed through a polarity reversing switch 68 to the input 70 of a preamplifier 72 which is combined with a clipper 82, the combined preamplifier and clipper being in a unit 73. A switch 74 is provided for connecting input 70 to a source 76 of 60 cycle alternating current for calibration, and a gain control potentiometer 78 is also provided. Transistors T1 and T2 are capacitance coupled and function as a non-compensating preamplifier, and when tape 26 is played back at high speed, the waveform at output 80 has a sharp peak representing the R wave of an ECG sequence. A sequence of such peaks, designated 80a to 80f is illustrated in FIG. 3, denoting two regularly spaced R waves 80a and 80b, a slight increase in rate between 80b and 80c, a rate decrease between 80c and 80d, a delayed beat between 80d and 80e, and a great increase in rate between 80e and 80f. Transistor T3 cooperates with transistor T2 to function as a clipper with the emitter-follower output 84 of clipper 82 feeding voltages graphed as a series of single sharp negative pulses 84a to 84f to the base of transistor T4 of a time delay circuit 86.

Time delay circuit 86 is a one-shot multivibrator. Normally, transistor T4 is on, or conducting, T5 is on and capacitor 88 is charged. When T5 conducts, its collector voltage biases the base of T4 in the conductive region so that T4 is biased "on." When T4 is turned "on," a current flows through its collector load R1 and the voltage appearing in output circuit 90 swings negative and a short negative pulse appears at the base of T5 because of the action of capacitor 88, but, since T5 is initially "on," it is unaffected by the short negative pulse and the delay circuit remains in quiescent state with T4 and T5 conducting until it is disturbed by a negative-going pulse in output 84. When the base of T4 receives a negative pulse via output 84 sufficient to momentarily turn it off, its collector voltage swings in the positive direction, and a positive pulse is transmitted via capacitor 88 to the base of T5, thereby turning T5 "off." The negative-going pulse in output 84 is also applied to the collector of T5 which assists in turning it "off." T5 remains (quasi-stable) "off" until capacitor 88 is re-charged via base resistor R2, thereby biasing the base of T5 so that T5 again conducts, whereupon time delay circuit 86 flips as previously described to its original quiescent state. The adjustment of variable capacitor 88 determines the time interval required to produce the back flip of the circuit and, hence, the time delay between the sharp negative pulses 84a through 84f which triggered circuit 86 and the negative swings 90a through 90f (FIG. 3) produced in output circuit 90 connected to the base of transistor T6, which causes it to conduct momentarily and amplify the negative-going pulse greatly.

Transistor T7 of shaper-clipper stage 92 serves as a clipper and phase inverter so that the pulses 92a through 92f appearing in its collector output 94 and at the base of T8 are negative and of short duration.

In sawtooth generator 96, transistor T9 is biased so as to conduct constantly and functions as a constant current device, and transistor T8 is normally off. During the "off" time of transistor T8, capacitor 98 discharges towards negative at a constant rate via T9. However, when transistor T8 is on, the voltage on that side of capacitor 98 which is connected to the collectors of T8 and T9 and to the base of T10 immediately swings positive because of the effective short circuit established across it by the emitter-collector circuit of T8. The voltages appearing at the base of transistor T10 are of sawtooth waveform, wherein the negative excursions are of straight-line characteristic, and the length of each negative excursion depends upon the length of time from one R wave of a magnitude comparable to an R wave, to the next. Thus, if the heart skips a beat and the time between R waves is doubly long, then the negative excursion appearing via output 100 at the base of transistor T10 will be of doubly long duration and voltage. If, however, the heart rate should increase momentarily so that the time between successive R waves is shorter, the negative excursion of the voltage at the base of T10 will be of correspondingly short duration and small magnitude. Illustrative, although not necessarily typical excursions are plotted and designated 98a through 98f in FIG. 3.

Transistors T10 and T11 serve as drivers for the two sides of a dual amplifier tube 102 in a differential amplifier stage 104 of conventional design having output leads 106, 108 connected to the horizontal external sweep circuit input terminals of oscilloscope 50. An output lead 109 from the collector circuit of T10 is also connected to one of the vertical sweep input terminals of oscilloscope 52, the other vertical sweep input terminal of oscilloscope 52 being connected to the common ground of the synchronizing chain. If full amplification of the synchronizing signal is desired for the vertical sweep of oscilloscope 52, its vertical sweep terminals may be connected to output leads 106 and 108. Both of the oscilloscopes have long image retention. The horizontal sweep of oscilloscope 52 is controlled by a free running sawtooth generator 110 providing a horizontal sweep of sufficient duration so that anywhere from about one hundred twenty to about two hundred negative excursions of the voltage on capacitor 98, depending upon the number of R waves or premature systoles of the subject, will appear as almost vertical lines on the face of tube 50a as diagrammed in FIG. 4. The lengths of the lines displayed on oscilloscope 52 will thus vary in accordance with the spacing between R waves, i.e., if the time intervals between a series of R waves are short and substantially uniform then a series of uniformly short lines will appear. If a double beat occurs, then an abnormally short line would appear.

Lines a' through f', FIG. 4 diagrammatically illustrate the manner in which the signals resulting from a series of R waves bearing the suffixes a through f diagrammed in FIG. 3 would appear on the face of the cathode ray tube in oscilloscope 52. Because of the straight line characteristic of the horizontal sweep voltage applied by sawtooth generator 110 the horizontal spacing between the lines, whose lengths vary in accordance with variations of time intervals between R waves, will also vary slightly in accordance with the time intervals.

The amplified voltages appearing on capacitor 98 applied via output leads 106, 108 to the external horizontal sweep circuit input terminals of oscilloscope 50 start the horizontal sweep at the same point on the face of tube 50a at the start of each of the negative excursions 98a through 98f of capacitor 98 and hence approximately at the start of each P wave derived from signal pick-up head 66 (see waveforms 140a–140f in FIG. 3).

The stages which comprise signal chain 46 are conventional, with the following characteristics. The input circuit 112 connecting preamplifier stage 114 with ECG signal pick-up head 66 is provided with a reversing switch 116 for applying the derived voltages in desired polarity to the base of transistor T12, an illustrative signal at its collector output lead 118 appearing generally as graphed on line 118 of FIG. 3 which shows a series of sharp peeks 118a through 118f corresponding to the R waves of the ECG sequence previously detailed in connection with the synchronizing chain 48, but displaced later in time as previously detailed. Output lead 118 has two branches, branch 120 leading to the base of a buffer transistor T13. Buffer transistor T13 has an output circuit 122 leading from potentiometer 124 in the collector circuit for T13 to a contact 126 for switch arm 128. Switch arm 128 is capacitor coupled to the base of a transistor T14, and transistors T14 and T14 serve as drivers in a differential amplifier stage 130, having a dual triode amplifying tube 131 whose output leads 132, 133 connect with the vertical sweep input terminals of oscilloscope 50. Switch arm 128 also is connected to the input 134 of a conventional audio amplifier 136 which drives a loud speaker 138 in the audio amplifier reproducer unit 54.

If switch arm 128 engages contact 126 as shown in FIG. 2B, and assuming a fast play-back setting for motor drive 58, a series of overlapping traces similar to the individual ECG sequences 118a through 118g of line 118 in FIG. 3 would appear on tube 50a, and assuming the waveforms were nearly the same for each trace, and sequence would appear as a single thick line trace, and a distinctive growling tone would be produced by loudspeaker 138. The system would ordinarily be operated in the FIG. 2A mode when it is desired to listen for variations in tone produced by changes in the ECG waveform pattern.

A more faithful visual reproduction of the ECG signals is obtainable by engaging switch arm 128 with contact 140 which interposes a compensating amplifier 142 in the ECG signal chain 46.

Compensating amplifier 142 is essentially an integrating circuit whose input 144 is a branch from the output of preamplifier stage 114, which leads to the base of a coupling transistor T16 whose emitter-follower output 146 controls the base of transistor T17. Transistor T18, whose collector is connected to the collector of T17 at junction 148, functions as a constant current device. Capacitor 150 is also connected to junction 148 and to the base of transistor T19. Hence, if the collector currents of T17 and T18 are equal, the charge on capacitor 150 is of a given voltage; if the collector current of T17 is less than that of T18, then capacitor 150 discharges, and if T17's collector current is greater, then capacitor 150 charges to a higher voltage. The voltage appearing at the base of T19 appears in its emitter-follower output 152 in amplification, and if fed via a feedback loop 154 to the input 112 of preamplifier 114 so as to reduce low frequency drift. Output 152 also connects with the base of transistor T20, which serves as an inverter, the collector of T20 being connected by lead 156 to the base of buffer transistor T21. Contact 140 is connected to a potentiometer 157 in the emitter circuit of T21.

The net effect of compensating amplifier 142 is to compensate for the over-emphasis of the high frequency components of the ECG signals, wherein the output of the ECG signal pick-up head 66 is a derivative of the signal recorded on the tape. The compensating amplifier 142 reduces the gain for the high frequency components to approximately the same extent as they are over-emphasized by the high velocity of the tape so that the voltage of the signal appearing at contact 140 appears as on line 140 of FIG. 3, which is a faithful reproduction of the original ECG signal derived at electrodes 22.

During normal heart activity, with the compensating amplifier operating in display signal chain 46, the trace on tube 50a would appear substantially like one of the waveforms 140a through 140f, but the trace would appear as a thick line because of slight variations in the successive ECG waveforms. Premature systoles appear as thin line traces offset from the main trace on tube 50a at the same time they appear as exceptionally short lines, such as line f1 on tube 52a. At the onset of and during an abnormality in the ECG pattern, such as occurs during a heart attack, the trace on tube 50a appears to writhe about.

Throughout the foregoing specification, certain arbitrary values and sequences have been selected to explain the functions of the system and its components. It will be understood by those skilled in the art that the system has great potential for detecting transient phenomena which, in some instances, are harbingers of chronic abnormalities or acute attacks. By applying a time scale to the read-out of a recording of long duration, the activities of the subject during or immediately preceeding the onset of a transient abnormality can be analyzed for possible causative relationship.

The invention is not limited to the particular components and arrangement disclosed herein, but is intended to cover all substitution, modifications and equivalents within the scope of the following claims.

We claim:

1. A system for recording and displaying successive electrocardiac signal sequences characterized by P, Q, R, S and T waves wherein the R wave is normally of greater magnitude than any of the preceding waves, comprising electrode means for deriving said signals from a subject, a magnetic recorder adapted to be carried about by the subject for recording said signals on a longitudinally moving tape, said recorder including two laterally spaced recording heads, means for simultaneously energizing said recording heads with the same signals derived by said electrode means, means for moving said tape past said recording heads at a fixed recording speed, said recording heads being longitudinally spaced in the direction of tape movement whereby the same signal sequences are recorded in two side-by-side and longitudinally offset signal tracks with the R wave of a given sequence longitudinally spaced along the tracks from the P wave of that sequence, a reproducing mechanism comprising two laterally spaced reproducing heads, one for each signal track, means for moving said tape past said heads at a fixed multiple of the recording speed, said reproducing heads being longitudinally spaced in the direction of tape movement by a distance different from the longitudinal spacing of the recording heads whereby the P wave of a given signal sequence on a track reaches one reproducing head at approximately the time that the start of the R wave of the same signal sequence reaches the other reproducing head, a cathode-ray oscilloscope having vertical and horizontal sweep circuit inputs, and amplifier circuit connecting said one reproducing head to the vertical sweep circuit input, and a synchronizing circuit connecting the other reproducing head with the horizontal sweep circuit input, said synchronizing circuit including means responsive exclusively to signals derived from the other reproducing head of a predetermined order of magnitude related to the successive R waves reproduced thereby for starting the horizontal sweep of said oscilloscope for a given signal sequence coincidentally with the start of the P wave of that signal sequence, whereby successive signal sequences produce overlapping traces on said oscilloscope.

2. The combination claimed in claim 1, said synchronizing circuit including variable time delay means, whereby the effect of the greater longitudinal spacing of the reproducing heads with respect to the longitudinal spacing of the recording heads may be reduced so as to correspondingly vary the time between the start of the horizontal sweep of the oscilloscope and the incidence of the R waves displayed thereon.

3. A system for recording and displaying successive electrocardiac signal sequences characterized by P, Q, R, S, and T waves wherein the R wave is normally of greater magnitude than any of the preceding waves, comprising electrode means for deriving said signal from a subject, a magnetic recorder adapted to be carried about by the subject for recording said signals on a longitudinally moving tape, said recorder including two laterally spaced recording heads, means for simultaneously energizing said recording heads with the same signals derived by said electrode means, means for moving said tape past said recording heads at a fixed recording speed, said recording heads being longitudinally spaced in the direction of tape movement whereby the same signal sequences are recorded in two side-by-side and longitudinally offset signal tracks with the R wave of a given sequence longitudinally spaced along the tracks from the P wave of that sequence, a reproducing mechanism comprising two laterally spaced reproducing heads, one for each signal track, means for moving said tape past said heads at a fixed multiple of the recording speed, said reproducing heads being longitudinally spaced in the direction of tape movement by a distance different from the longitudinal spacing of the recording heads whereby the P wave of a given signal sequence on a track reaches one reproducing head at approximately the time that the start of the R wave of the same signal sequence reaches the other reproducing head, a first cathode-ray oscilloscope having vertical and horizontal sweep circuit inputs, an amplifier circuit connecting said one reproducing head to the vertical sweep circuit input, and a synchronizing circuit connecting the other reproducing head with the horizontal sweep circuit input, said synchronizing circuit including a capacitor, constant current means for charging said capacitor at a fixed rate, means responsive exclusively to signals derived from the other reproducing head of a predetermined order of magnitude related to the successive R waves reproduced thereby for discharging said capacitor, means connecting said capacitor to the horizontal sweep circuit input of said first oscilloscope starting the horizontal sweep thereof coincidentally with the start of the charging of the capacitor, whereby the trace of each signal sequence starts coincidentally with the start of the P wave of that signal sequence; a second cathode ray oscilloscope having horizontal and vertical sweep circuit inputs, free-running sawtooth generator means connected to one of the latter inputs for sweeping the beam of said second oscilloscope in one of said vertical and horizontal directions, and means connecting said capacitor to the other of the latter inputs for deflecting the last-named beam in the other direction in accordance with the charge and discharge of said capacitor.

4. The combination claimed in claim 3, said synchronizing circuit including variable time delay means, whereby the effect of the greater longitudinal spacing of the reproducing heads with respect to the longitudinal spacing of the recording heads may be reduced so as to correspondingly vary the time between the start of the horizontal sweep of the oscilloscope and the incidence of the R waves displayed thereon.

5. A system for recording and displaying successive electrocardiac signal sequences characterized by P, Q, R, S and T waves wherein the R wave is normally of greater magnitude than any of the preceding waves, comprising electrode means for deriving said signals from a subject, a magnetic recorder adapted to be carried about by the subject for recording said signals on a longitudinally moving tape, said recorder including two laterally spaced recording heads, means for simultaneously energizing said recording heads with the same signals derived by said electrode means, means for moving said tape past said recording heads at a fixed recording speed, said recording heads being longitudinally spaced in the direction of tape movement whereby the same signals are recorded in two side-by-side and longitudinally offset signal tracks with the R wave of a given sequence longitudinally spaced along the tracks from the P wave of that sequence, a reproducing mechanism comprising two laterally spaced reproducing heads, one for each signal track, means for moving said tape past said heads at a fixed multiple of the recording speed, said reproducing heads also being longitudinally spaced in the direction of tape movement, a cathode-ray oscilloscope having vertical and horizontal sweep circuit inputs, an amplifier circuit connecting said one reproducing head to the vertical sweep circuit input, and a synchronizing circuit connecting the other reproducing head with the horizontal sweep circuit input, said synchronizing circuit including means responsive exclusively to impulses of the order of magnitude of the successive R waves reproduced thereby for starting the successive horizontal sweep of said oscilloscope coincidentally with the start of the P wave of each signal sequence, whereby successive signal sequences produce overlapping traces on said oscilloscope.

6. The combination claimed in claim 5, said synchronizing circuit also including variable time delay means for adjusting the time between the start of the horizontal sweep of the oscilloscope and the incidence of the R waves displayed thereon.

7. A system for recording and displaying successive electrocardiac signal sequences characterized by P, Q, R, S and T waves wherein the R wave is normally of greater magnitude than any of the preceding waves, comprising electrode means for deriving said signals from a subject, a magnetic recorder adapted to be carried about by the subject for recording said signals on a longitudinally moving tape, said recorder including two laterally spaced recording heads, means for simultaneously energizing said recording heads with the same signals derived by said electrode means, means for moving said tape past said recording heads at a fixed recording speed, said recording heads being longitudinally spaced in the direction of tape movement whereby the same signal sequences are recorded in two side-by-side and longitudinally offset signal tracks with the R wave of a given sequence longitudinally spaced along the tracks from the P wave of that sequence, a reproducing mechanism comprising two laterally spaced reproducing heads, one for each signal track, means for moving said tape past said heads at a fixed multiple of the recording speed, said reproducing heads being longitudinally spaced in the direction of tape movement, a first cathode ray oscilloscope having vertical and horizontal sweep circuit inputs, an amplifier circuit connecting said one reproducing head to the vertical sweep circuit input, and a synchronizing circuit connecting the other reproducing head with the horizontal sweep circuit input, said synchronizing circuit including a capacitor, constant current means for charging said capacitor at a fixed rate, means responsive exclusively to signals derived from the other reproducing head of a predetermined order of magnitude related to the successive R waves reproduced thereby for discharging said capacitor, means connecting said capacitor to the horizontal sweep circuit input of said first oscilloscope starting the horizontal sweep thereof coincidentally with the start of the charging of the capacitor, a second cathode ray oscilloscope having horizontal and vertical sweep circuit inputs, free-running sawtooth generator means connected to one of the latter inputs for sweeping the beam of said second oscilloscope in one of said vertical and horizontal directions, and means connecting said capacitor to the other of the latter inputs for deflecting the last-named beam in the other direction in accordance with the charge and discharge of said capacitor.

8. The combination claimed in claim 6, said amplifier circuit including means to compensate for signal distortion resulting from the movement of the tape past the reproducing heads at a multiple of the recording speed.

9. A method for recording and displaying successive electrocardiac signal sequences characterized by P, Q, R, S and T waves wherein the Q-R-S complex normally has higher frequency components of greater magnitude than the P wave which comprises recording said signal sequences at a fixed rate on a magnetic medium, producing two derivatives of the recorded sequences characterized by emphasis of the Q-R-S complex by playing the recorded signals back on a reproduced at a higher rate than the recording rate, restoring only one of the derivatives to its recorded wave form, utilizing the restored derivative for the vertical sweep of a cathode ray oscilloscope, and utilizing the unrestored derivative for triggering an amplitude-responsive synchronizing circuit for the horizontal sweep of the oscilloscope.

References Cited by the Examiner

UNITED STATES PATENTS 3,123,768   3/1964   Burch et al. _____ 128—2.06 X

OTHER REFERENCES

Annals New York Academy of Sciences, 1957, pages 913–923, article by Norman J. Holter.

RICHARD A. GAUDET, *Primary Examiner.*

SIMON BRODER, *Examiner.*